United States Patent [19]

Parks et al.

[11] 4,067,464

[45] Jan. 10, 1978

[54] HEIGHT ADJUSTABLE REFUSE COMPACTION AND EJECTION SYSTEM

[76] Inventors: Melvin Hal Parks, 1079 S. 160 East, Orem, Utah 84057; Melvin Ray Parks, P.O. Box 1037, Boise, Idaho 83701

[21] Appl. No.: 781,154

[22] Filed: Mar. 25, 1977

[51] Int. Cl.[2] .......................... B65G 67/02; B65F 3/00

[52] U.S. Cl. ................................ 214/38 BA; 214/510

[58] Field of Search .............. 214/38 R, 38 B, 38 BA, 214/41 R, 501, 502, 503, 508, 509, 510, 82

[56] References Cited

U.S. PATENT DOCUMENTS 3,966,096 6/1976 Worthington .................. 214/510 X

*Primary Examiner*—Robert G. Sheridan

*Attorney, Agent, or Firm*—Criddle, Thorpe & Western

[57] ABSTRACT

In a refuse compaction and ejection system for location adjacent to a wall, truck cab, or other body which would restrict vertical angular movement due to lack of free space therebetween, a body slide-lift mechanism for shifting the refuse storage compartment rearward in combination with vertical movement to adjust the level of refuse ejection to a desired height. The refuse storage compartment containing the appropriate compaction and ejection components is rotatably affixed at its forward end to a support base by means of a slotted flange-pin assembly. A support-base-mounted hydraulic cylinder oriented along the length of and attached to the floor of the storage compartment provides the power to reciprocate the compartment from its horizontal, adjacent location to its extended, elevated ejection level.

9 Claims, 3 Drawing Figures

HEIGHT ADJUSTABLE REFUSE COMPACTION AND EJECTION SYSTEM

BACKGROUND OF THE INVENTION

1. Field of Invention

This invention relates to ejection systems for refuse compacting containers, and more specifically to refuse systems utilizing a height adjustable, rearward ejection system.

2. Prior Art

The advent of refuse collection by means of large trucks having automated compaction capability was soon followed by smaller pick-up units adapted to movement in more limited spaces. Customarily, such pick-up units would cater to customers whose refuse pick-up sites were inaccessible to the larger compaction trucks. The need for increased mobility demanded improved compaction systems housed in small compaction compartments with maximum material movement capability.

Small compaction units were developed which utilized the compaction principles of the larger trucks but were mounted on a smaller truck body or in the bed of a pick-up truck. Upon being filled to capacity, the small unit would rendezvous with a larger parent truck which would receive its compacted contents. This cycle would be repeated until the parent truck was filled.

To properly transfer the refuse from the smaller unit to the parent truck the ejection level and receiving level of the respective units would necessarily have to be matched. Since the mechanical structure of the parent truck made vertical adjustments of its receiving compartment impractical, systems were developed for raising and lowering the ejection level of the smaller unit. Such systems commonly use a vertically mounted hydraulic lifter to coordinate the tailgate ejection level with the parent truck.

Since raising the rearward section of the small compaction unit involves a corresponding forward displacement of its front top section, a region of free space between the truck cab and compaction unit was required, to permit the ejection leveling process to function. With the storage capacity of these smaller units already limited by their reduced size, the required free space meant added waste of space, further reducing storage capacity. This lost capacity plus the increased economic loss due to the necessity of more frequent rendezvous trips with the parent truck, in combination with the added costs of fuel and operator time, suggest the need for an improved system to overcome such disadvantages.

OBJECTIVES AND SUMMARY OF THE INVENTION

It is an object of the present invention to provide a system for minimizing wasted space otherwise necessitated for vertical adjustment of the ejection level in a material compaction unit.

It is a further objective to coordinate (1) the rearward displacement movement of the compaction compartment away from the obstructing body with (2) the movement to obtain vertical displacement of the ejection level.

It is an additional objective to accomplish the aforementioned objectives utilizing a single power drive unit.

The present invention eliminates the need for the aforementioned free space between the truck cab and compaction unit during non-ejection operations. The elimination of free space provides for minimized waste and maximum mobility in the collection phase of operations. During ejection of refuse, the free space requirement is satisfied by means of a slotted flange-pin assembly which connects the compaction unit to the truck frame or support base. The slot configuration forms a parallel track with the length of the compaction compartment and permits a single hydraulic extender to shift the compaction body rearward sufficient space to allow for subsequent vertical adjustment of the ejection level. The length of the slot controls the range of horizontal body displacement while the length of extension of the hydraulic cylinder controls body height.

DETAILED DESCRIPTION OF THE INVENTION

Figure 1:
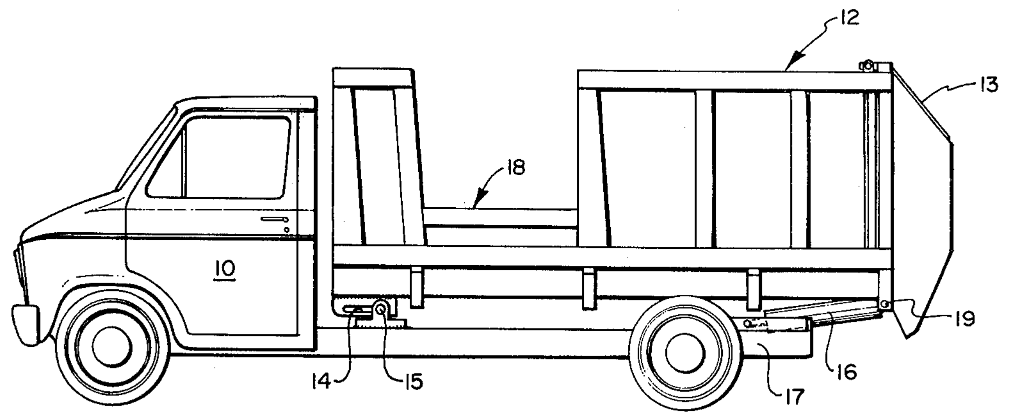
FIG. 1 represents the displacement/ejection system in use with a carrier vehicle in which the compaction compartment is in the nonextended configuration utilized in refuse collection operations.
Figure 2:
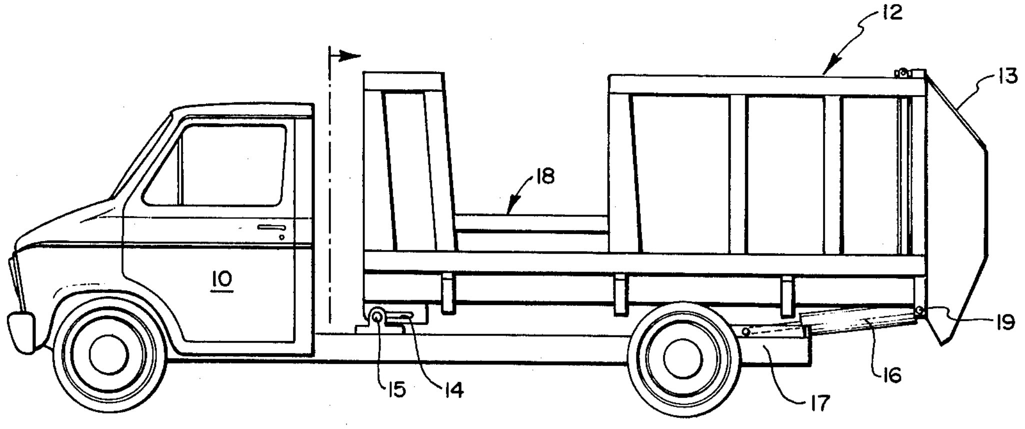
FIG. 2 shows the horizontal rearward displacement of the compaction compartment required to develop the necessary free space prior to elevation of the rear ejection level.
Figure 3:
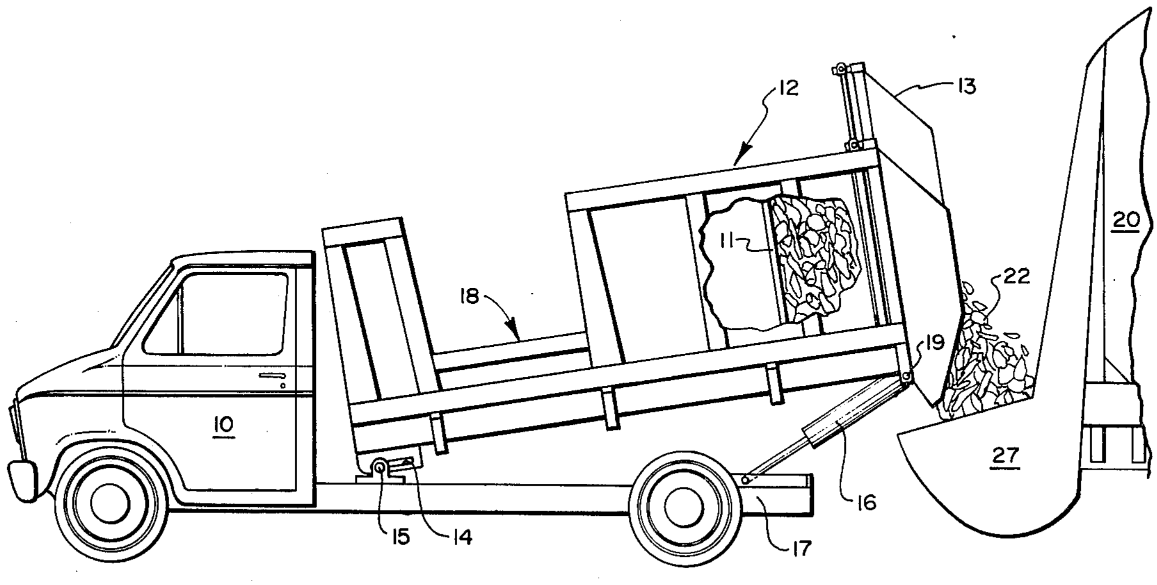
FIG. 3 demonstrates the fully extended, height adjusted ejection phase of operations.

Referring to FIGS. 1 through 3, the use of the present invention in combination with a carrier vehicle includes a conventional storage and compaction compartment 12 having rearward ejection means 11 and refuse receiving means 18. During collection operations the forward compartment body is located in close proximity to the cab 10 or other obstructing object, minimizing waste of available space. This location also provides improved weight distribution for economy and safety. Furthermore, such a configuration is critical where operation of the vehicle occurs in narrow passage ways having restricted access. Refuse is collected and compacted until the storage compartment is filled. The vehicle then returns to a parent truck 20 for discharge of its contents.

To facilitate elevation of the ejection level to correspond with the height of the receiving compartment 27 of parent truck 20, the compaction compartment rests on a support base 17 attached at two front slotted flange-pin connection sites 14 and at a rearward hydraulic cylinder attachment site 19. The slotted flange-pin arrangement comprises a flange 14 extending downward from the lateral front base portion of the storage compartment, the flange be slotted along its length to provide for horizontal movement of the compartment. Pin 15 is immovably attached to the supporting base 17 and operates as a guide to minimize lateral movement and to control the reciprocating movement of the compartment along a portion of the length of the support base. It is apparent that the configuration and attachment of the slotted-flange and pin respectively may be reversed, i.e., that the pin and flange may be attached to the compartment and support base respectively.

Upon extension of the hydraulic cylinder 16 the compaction body is displaced rearward from its front limiting position (FIG. 1) until pin 15 contacts the distal side of the slot which represents its rearward limiting position (FIG. 2). This latter point of contact further defines the axis of rotation for the compaction compartment as the elevation cycle begins. This cycle commences as the hydraulic cylinder further extends, developing a vertical component of force to raise the rear compartment to a suitable height (FIG. 3). Thereafter, a conventional ejection blade 11 is activated in combination with the opening mechanism for the ejection means 13 to discharge the compacted refuse 22. Such ejection means might include a tailgate assembly as depicted in the figures. After ejection of refuse, the hydraulic cylinder 16 retracts, causing the reciprocal movement of the compaction body to the nonextended configuration of FIG. 1.

Other methods of accomplishing the present invention will be apparent, varying the mechanical implementation of the principles herein demonstrated. Likewise, other uses in addition to that illustrated are envisioned. Such a use might consist of the present invention in combination with a fixed storage/compaction container which is retained in close proximity to a building. Upon arrival of a large capacity refuse truck, the truck operator adjusts the rearward displacement and container discharge height to correspond to the truck receiving height and ejects the contained refuse therein.

We claim:

1. In a material compaction and ejection system having a storage compartment with height adjustable rearward ejection means and being affixed to a supporting base, an improved body lift mechanism for displacing said compartment away from an obstructing object and adjusting said rearward ejection means to variable heights comprising:

a. guide means immovably attached to said support base and operable in combination with said affixing means to permit limited reciprocal movement of said storage compartment from a front limiting point to a rearward limiting point along a length of said support base;

b. power means for applying reciprocating force with respect to said storage compartment, said force including vertical and horiziontal components, said vertical component being applied at a rearward part of said storage compartment and operable to raise said ejection means to a desired height with respect to said support base; and c. connecting means from a front portion of said storage compartment to said support base, said connecting means being operable in combination with said guide means to permit said limited reciprocating movement along said guide means, said connecting means further permitting angular vertical movement of said storage compartment about an axis normal to said reciprocating movement and forward of said rearward part of vertical force application.

2. A system as defined in claim 1, wherein said guide means comprises flange members, each having a slotted opening and protruding from forward, lateral base portions of said storage compartment in parallel orientation with said reciprocating movement, said slotted openings being operable to define a path for said reciprocating movement between front and rearward limiting points.

3. A system as defined in claim 2, wherein said connecting means comprises pins immovably affixed to said support base in orientation such that said affixed pins traverse said slotted openings and operate to limit the reciprocating movement of said storage compartment to said reciprocating path.

4. A system as defined in claim 1, wherein said guide means comprises flange members each having a slotted opening and protruding from forward lateral portions of said support base in parallel orientation with said reciprocating movement, said slotted openings being operable to define a path for said reciprocating movement between front and rearward limiting points.

5. A system as defined in claim 4, wherein said connecting means comprises pins immovable affixed to said storage compartment in orientation such that said affixed pins traverse said slotted openings and operate to limit the reciprocating movement of said storage compartment to said reciprocating path.

6. A system as defined in claim 1, wherein said power means comprises an hydraulic cylinder power mechanism.

7. A system as defined in claim 1, wherein said system is used in combination with a mobile vehicle whose structure, in part, comprises said obstructing object.

8. A system as defined in claim 1 wherein said system is affixed in a stationary location, said ejection of compacted material being to a receiving means which is transported to said location for material pickup.

9. A system as defined in claim 1 wherein said material is refuse.

* * * * *

UNITED STATES PATENT AND TRADEMARK OFFICE

CERTIFICATE OF CORRECTION

PATENT NO. : 4,067,464

DATED : January 10, 1978

INVENTOR(S) : Melvin Hal Parks, Melvin Ray Parks

It is certified that error appears in the above-identified patent and that said Letters Patent are hereby corrected as shown below:

In line 46 of column 2, delete the period immediately preceeding the term "the".

Signed and Sealed this

*Eleventh* Day of *July 1978*

[SEAL]

*Attest:*

RUTH C. MASON
*Attesting Officer*

DONALD W. BANNER
*Commissioner of Patents and Trademarks*